United States Patent
Ooshima et al.

(10) Patent No.: US 10,975,958 B1
(45) Date of Patent: Apr. 13, 2021

(54) VEHICLE CONTROL DEVICE AND VEHICLE CONTROL METHOD

(71) Applicant: ISUZU MOTORS LIMITED, Tokyo (JP)

(72) Inventors: Tatsuya Ooshima, Saitama (JP); Nobuyuki Nishimura, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 10 days.

(21) Appl. No.: 16/612,695

(22) PCT Filed: May 9, 2018

(86) PCT No.: PCT/JP2018/017944
§ 371 (c)(1),
(2) Date: Nov. 11, 2019

(87) PCT Pub. No.: WO2018/207823
PCT Pub. Date: Nov. 15, 2018

(30) Foreign Application Priority Data

May 12, 2017 (JP) .............................. JP2017-095967

(51) Int. Cl.
*F16H 59/66* (2006.01)
*F16H 59/44* (2006.01)
(Continued)

(52) U.S. Cl.
CPC ............. *F16H 59/66* (2013.01); *F16H 59/18* (2013.01); *F16H 59/44* (2013.01); *F16H 61/16* (2013.01);
(Continued)

(58) Field of Classification Search
CPC .......... F16H 59/18; F16H 59/44; F16H 59/66; F16H 2059/142; F16H 2059/663; F16H 2059/6815; F16H 61/16; F16H 2061/0012
See application file for complete search history.

(56) References Cited

U.S. PATENT DOCUMENTS 4,713,764 A * 12/1987 Klatt .................. F16H 61/0213
701/65
5,832,400 A 11/1998 Takahashi et al.
(Continued)

FOREIGN PATENT DOCUMENTS

CN 103998830 A 8/2014
JP H08072591 A 3/1996
(Continued)

OTHER PUBLICATIONS

International Search Report and Written Opinion for PCT App No. PCT/JP2018/017944 dated Aug. 7, 2018, 9 pgs.
(Continued)

*Primary Examiner* — Edwin A Young
(74) *Attorney, Agent, or Firm* — Procopio, Cory, Hargreaves & Savitch LLP (57) ABSTRACT

This vehicle control devices provided with: a travel segment determination unit 15 which determines a next travel segment, forwards in the travel direction of the vehicle, which has a different road slope from the current travel segment where the vehicle is currently traveling; a next gear stage selection unit 16 which, on the basis of the road slope of the next travel segment, selects a next gear stage, which will be the gear stage of the vehicle in the next travel segment; and a shift control unit 17 which upshifts to the next gear stage in the current travel segment in the case that the travel resistance in the next travel segment is less than the travel resistance of the current travel segment, the value obtained by subtracting the travel resistance of the vehicle in the current travel segment from the drive force at the current speed of the vehicle in the next gear stage is less than a first prescribed value, and the value obtained by subtracting the travel resistance of the vehicle in the next travel segment (Continued)

from the drive force at the current vehicle speed in the next gear stage is less than a second prescribed value.

10 Claims, 8 Drawing Sheets

(51) Int. Cl.
*F16H 61/16* (2006.01)
*F16H 59/18* (2006.01)
*F16H 59/14* (2006.01)

(52) U.S. Cl.
CPC .. *F16H 2059/142* (2013.01); *F16H 2059/663* (2013.01)

(56) References Cited

U.S. PATENT DOCUMENTS 5,931,886 A    8/1999  Moroto et al.
2010/0324793 A1*  12/2010  Winkel ............... F16H 61/0213
                                                    701/65
2014/0315686 A1   10/2014  Matsuo et al.
2017/0146116 A1*   5/2017  Lowndes ............ B60W 30/143
2019/0154143 A1*   5/2019  Ganske .................. F16H 59/68

FOREIGN PATENT DOCUMENTS

JP    H09021457 A     1/1997
JP    H10059015 A     3/1998
JP    H11037276 A     2/1999
JP    2014194254 A   10/2014
JP    2014196984 A   10/2014

OTHER PUBLICATIONS

Office Action for related CN App. No. 201880030978.9 dated Aug. 17, 2020. English translation provided; 10 pages.

\* cited by examiner

VEHICLE CONTROL DEVICE AND VEHICLE CONTROL METHOD

CROSS-REFERENCE TO RELATED APPLICATIONS

This application is a U.S. National Stage entry of PCT Application No: PCT/JP2018/017944 filed on May 9, 2018, which claims priority to Japanese Patent Application No. 2017-095967, filed May 12, 2017, the contents of which are incorporated herein by reference.

TECHNICAL FIELD

The present disclosure relates to a vehicle control device configured to control a gear stage to upshift, and a vehicle control method.

BACKGROUND ART

There has been proposed a technique for setting a shift schedule to minimize fuel consumption amount on a travel route based on: road information of a travel route from a current position of a vehicle to a target position thereof; and drive force of the vehicle in the travel route (see PTL 1).

CITATION LIST

Patent Literature

PTL 1: JP-A-9-21457

SUMMARY OF INVENTION

Technical Problem

Generally, the fuel consumption amount of a vehicle can be reduced when a gear stage as high as possible is selected. However, in a case where the vehicle travels at an upslope, a relative low gear stage is required to be selected in order to obtain acceleration. Therefore, in a related-art automatic transmission, in a case where a slope on a road on which the vehicle is currently traveling changes, the fuel consumption amount of the vehicle may be increased because of a selection of a gear stage with considering allowance drive force obtained by subtracting travel resistance from the maximum drive force of the vehicle.

The present disclosure is made in view of these situation, and an object of the present disclosure is to provide a vehicle control device and a vehicle control method which can prevent an increase in the fuel consumption amount in a case where a slope on a mad on which the vehicle is currently traveling changes.

Solution to Problem

According to a first aspect of the present disclosure, there may be provided a vehicle control device comprising: a travel segment determination unit configured to determine a next travel segment ahead of a vehicle in a travelling direction, the next segment being a travel segment with a road slope different from that of a current travel segment where the vehicle is currently traveling; a next gear stage selection unit configured to select a next gear stage, which is a gear stage of the vehicle in the next travel segment, based on the road slope of the next travel segment; and a shift control unit configured to perform upshifting to the next gear stage in the current travel segment in a case: a travel resistance in the next travel segment is smaller than a travel resistance in the current travel segment; a value obtained by subtracting the travel resistance of the vehicle in the current travel segment from a drive force at a current speed of the vehicle at the next gear stage is less than a first predetermined value; and a value obtained by subtracting the travel resistance of the vehicle in the next travel segment from a drive force at the current speed of the vehicle at the next gear stage is equal to or greater than a second predetermined value.

The shift control unit may be configured to perform the upshifting to the next gear stage in the current travel segment in a case: the drive force at the current speed of the vehicle at the next gear stage is equal to or greater than the travel resistance of the vehicle in the current travel segment: and the value obtained by subtracting the travel resistance of the vehicle in the next travel segment from the drive force at the current speed of the vehicle at the next gear stage is equal to or greater than the second predetermined value.

The vehicle may have: an automatic drive mode in which a constant-speed traveling is performed automatically; and an operation travel mode in which travelling is performed by an accelerator operation by a driver, and the shift control unit may be configured to postpone the upshifting to the next gear stage in a case: the value obtained by subtracting the travel resistance of the vehicle in the current travel segment from the drive force at the current speed of the vehicle at the next gear stage is less than the first predetermined value in the operation travel mode; and a distance of a remaining segment of the current travel segment is equal to or greater than a predetermined distance.

The shift control unit may be configured not to postpone the upshifting to the next gear stage in a case: the value obtained by subtracting the travel resistance of the vehicle in the current travel segment from the drive force at the current speed of the vehicle at the next gear stage is less than the first predetermined value in the operation travel mode; a distance of the remaining segment of the current travel segment is equal to or greater than the predetermined distance; and a speed of the vehicle is an upper limit speed set for the vehicle.

The shift control unit may be configured not to perform the upshifting to the next gear stage in a case an accelerator opening degree of the vehicle is equal to or greater than a threshold in the automatic drive mode.

According to a second aspect of the present disclosure, there may be provided a vehicle control method for a vehicle comprising a transmission and a control unit, the method comprising controlling the control unit to perform: a step of determining a next travel segment ahead of the vehicle in a travel direction, the next travel segment being a travel segment with a road slope different from that of a current travel segment where the vehicle is currently traveling; a step of selecting a next gear stage, which is a gear stage of the vehicle in the next travel segment, based on the road slope of the next travel segment; and a step of performing a shift control of upshifting to the next gear stage in the current travel segment in a case: a travel resistance in the next travel segment is smaller than a travel resistance in the current travel segment; a value obtained by subtracting the travel resistance of the vehicle in the current travel segment from a drive force at a current speed of the vehicle at the next gear stage is less than a first predetermined value; and a value obtained by subtracting the travel resistance of the vehicle in the next travel segment from a drive force at the current speed of the vehicle at the next gear stage is equal to or greater than a second predetermined value.

Advantageous Effects of Invention

According to the present disclosure, it is possible to prevent an increase in the fuel consumption amount in a case where a slope on a road on which the vehicle is currently traveling changes.

DESCRIPTION OF EMBODIMENTS

<Illustrative Embodiment>[Summary of Vehicle V According to Illustrative Embodiment]

Figure 1:
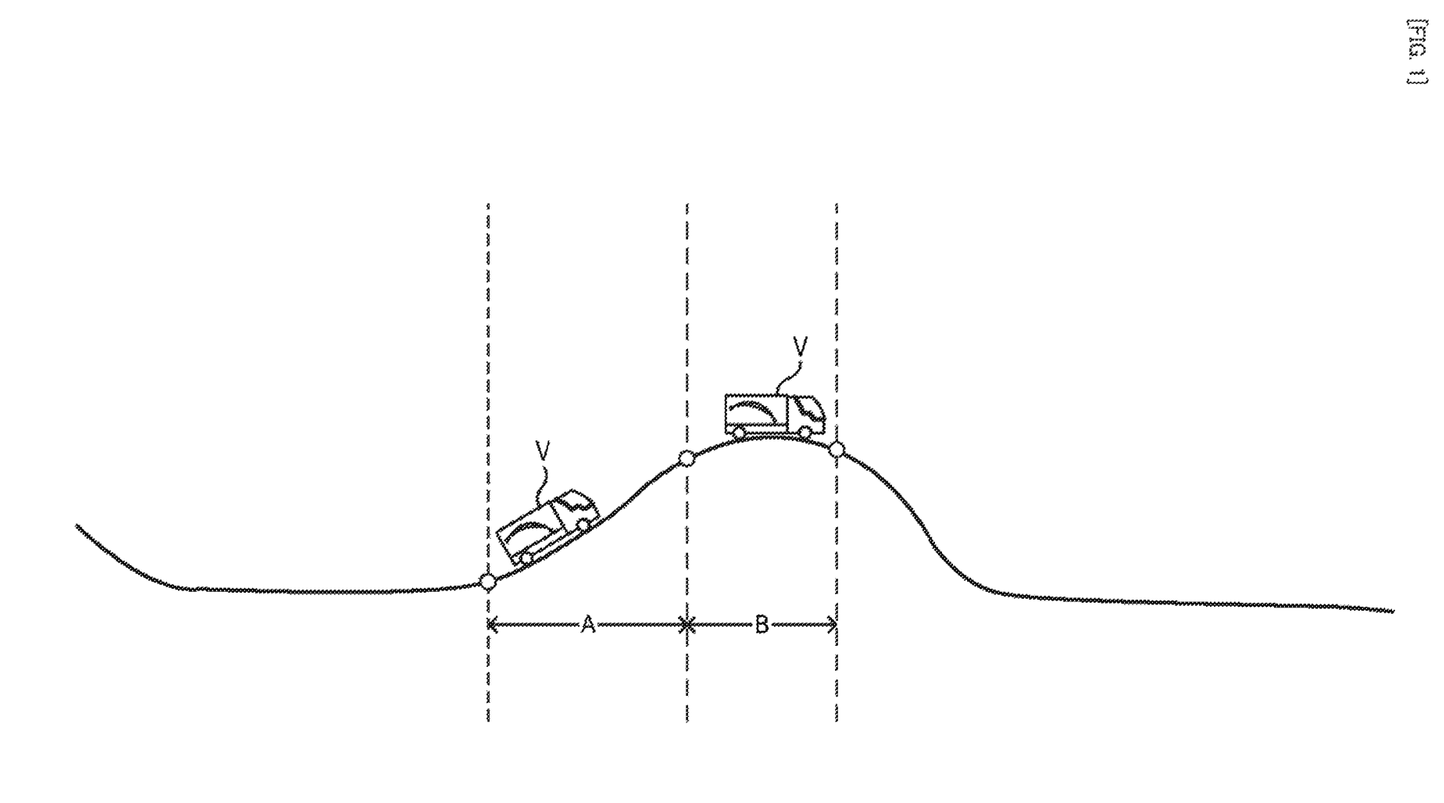
FIG. 1 is a diagram showing an outline of a vehicle according to an illustrative embodiment.

A summary of a vehicle V according to the illustrative embodiment will be described with reference to FIG. 1. FIG. 1 is a diagram showing an outline of a vehicle on which a vehicle control device 10 (e.g., an electronic control unit (ECU) according to the present illustrative embodiment is mounted. The vehicle control device 10 changes a gear stage of the vehicle V by controlling a transmission.

The vehicle V travels in a continuous segment between a current travel segment A and a next travel segment B with an average road slope less than that of the current travel segment A. A travel segment is a segment whose road slope is considered to be equal. The current travel segment A is a travel segment where the vehicle V is currently travelling, and the next travel segment B is a travel segment which is adjacent to the current travel segment A and is ahead of the current travel segment A in a travel direction of the vehicle V. A road slope of the next travel segment B differs from that of the current travel segment A.

The vehicle control device 10 shifts the vehicle V to the highest gear stage among gear stages at which drive force, which is larger than travel resistance of the road by a predetermined value D1 or more, can be generated. The prescribed value D1 can be appropriately determined, for example, as a value for a driver to feel a predetermined responsiveness to accelerator operation. In addition, the vehicle control device 10 determines drive force generated in the vehicle V after shift transmission of a gear stage in the current travel segment A and the next travel segment B. In a case where the determined drive force satisfy a condition that will be described below, the vehicle control device 10 controls the gear stage to upshift in advance in the current travel segment A before the vehicle V reaches a start point of the next travel segment B. As a result, an upshifting timing of the vehicle control device 10 is earlier than, for example, that in the case of upshifting at the start point of the next travel segment. Accordingly, fuel consumption can be improved.

[Configuration of Vehicle According to Illustrative Embodiment]

Figure 2:
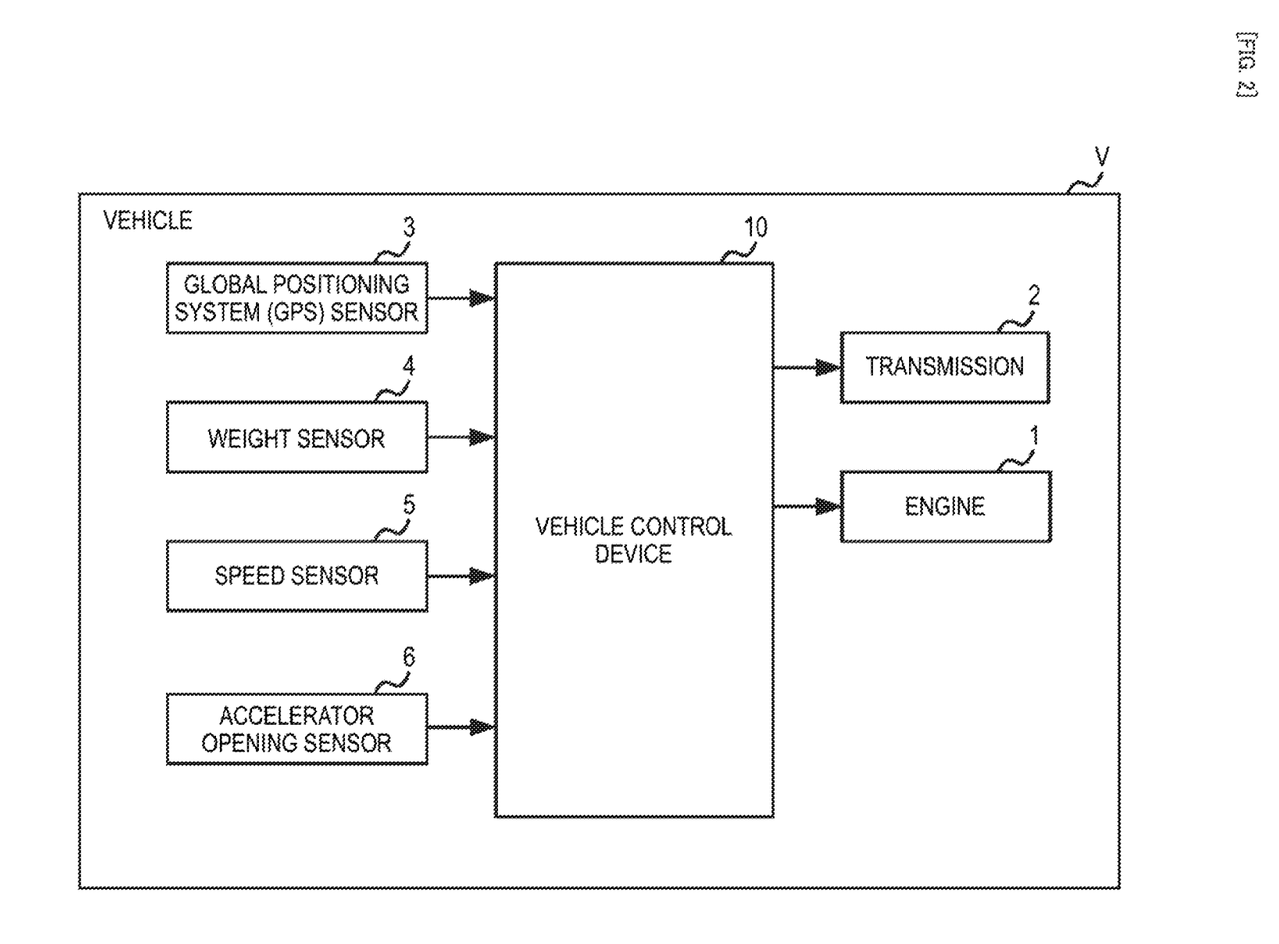
FIG. 2 is a diagram showing a configuration of the vehicle according to the illustrative embodiment.

A configuration of the vehicle V according to the present illustrative embodiment will be described with reference to FIG. 2. FIG. 2 is a diagram schematically showing a configuration of the vehicle V according to the present illustrative embodiment. The vehicle V according to the present illustrative embodiment includes an engine 1, a transmission 2, a global positioning system (GPS) sensor 3, a weight sensor 4, a speed sensor 5, an accelerator opening sensor 6, and the vehicle control device 10.

The vehicle V is a large vehicle that uses the engine 1, such as a diesel engine, to provide drive force, and is, in particular, a vehicle having an auto travel mode. The transmission 2 transmits rotational drive force of the engine 1 to a drive wheel (not shown) of the vehicle V. The transmission 2 includes a plurality of stages of gears for converting the drive force of the engine 1.

Here, the "automatic travel mode" in the vehicle V refers to a mode in which the engine 1, the transmission 2, and the like automatically perform constant speed traveling by the vehicle control device 10 so as to maintain a speed of the vehicle V set in advance even if the driver does not operate an accelerator or a shift lever. It is mainly assumed that the automatic travel mode is used when the vehicle V travels on a highway. On the other hand, an "operation travel mode" in the vehicle V is a mode different from the auto travel mode, and is a mode in which the vehicle travels with accelerator operation of the driver.

The GPS sensor 3 receives and analyzes radio waves transmitted from a plurality of navigation satellites, so as to obtain a position of the GPS sensor 3, that is, a position of the vehicle V on which the GPS sensor 3 is mounted. The GPS sensor 3 outputs information indicating the position of the vehicle V to the vehicle control device 10.

The weight sensor 4 obtains total weight of the vehicle V. Specifically, the weight sensor 4 obtains the total weight of the vehicle V by measuring weight of a load of the vehicle V and adding up the weight of the load and weight of the vehicle V alone excluding the load. The weight sensor 4 outputs information indicating the total weight of the vehicle V to the vehicle control device 10.

The speed sensor 5 measures the speed of the vehicle V. The speed sensor 5 outputs information indicating the measured speed of the vehicle V to the vehicle control device 10. The accelerator opening sensor 6 measures an accelerator opening degree that is a press-down amount of a pedal of an accelerator by a driver of the vehicle V. The accelerator opening sensor 6 outputs information indicating the accelerator opening degree to the vehicle control device 10.

The vehicle control device 10 obtains information from each of the sensors described above, and controls, based on the obtained information, the amount of fuels to be supplied to a cylinder in the engine 1 and the gear stages of the transmission 2. In a case where the vehicle V is in the automatic travel mode, the vehicle control device 10 controls the engine 1 and the transmission 2 such that the vehicle V travels at a set speed. In addition, in a case where a speed limit device (SLD) of the vehicle V is operating, the vehicle control device 10 controls the engine 1 and the transmission 2 such that the speed of the vehicle V does not exceed the set maximum speed.

[Configuration of Vehicle Control Device]

Figure 3:
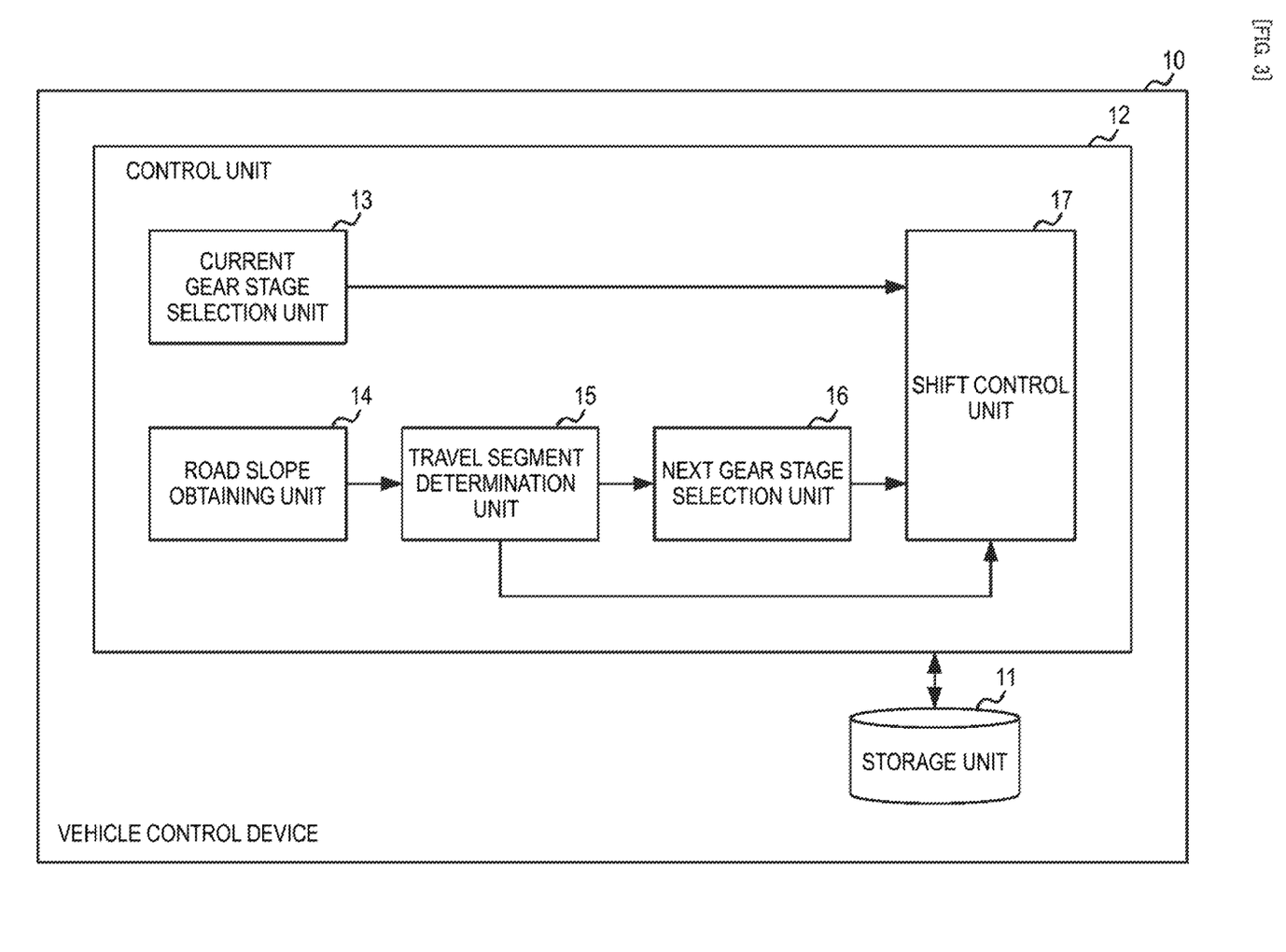
FIG. 3 is a diagram showing a configuration of a vehicle control device according to the illustrative embodiment.

FIG. 3 is a diagram showing a configuration of the vehicle control device 10 according to the present illustrative embodiment. The vehicle control device 10 according to the present illustrative embodiment includes a storage unit 11 and a control unit 12.

The storage unit 11 is, for example, a read only memory (ROM) or a random access memory (RAM). The storage unit 11 stores various programs for causing the control unit 12 to perform operations.

The control unit 12 is a computational resource which includes a processor such as a central processing unit (CPU) (not shown). The control unit 12 functions as a current gear stage selection unit 13, a road slope obtaining unit 14, a travel segment determination unit 15, a next gear stage selection unit 16, and a shift control unit 17 by executing a program stored in the storage unit 11.

The current gear stage selection unit 13 selects a current gear stage, which is a gear stage of the transmission 2 in a current travel segment, based on travel resistance of the vehicle V in the current travel segment A. Here, the travel resistance in the current travel segment A is resistance obtained by adding up rolling resistance of a tire of the vehicle V, air resistance applied to the vehicle V, slope resistance based on a slope of a road on which the vehicle V is currently traveling, and the like.

The current gear stage selection unit 13 measures drive force and acceleration of the vehicle V, and determines the travel resistance of the vehicle V from a relationship between the drive force and the acceleration of the vehicle V. The current gear stage selection unit 13 selects the highest gear stage, as a current gear stage, among gear stages at which the drive force of the vehicle V is larger than the travel resistance of the vehicle V in the current travel segment A by the predetermined value D1 or more.

[Method for Selecting Current Gear]

Figure 4:
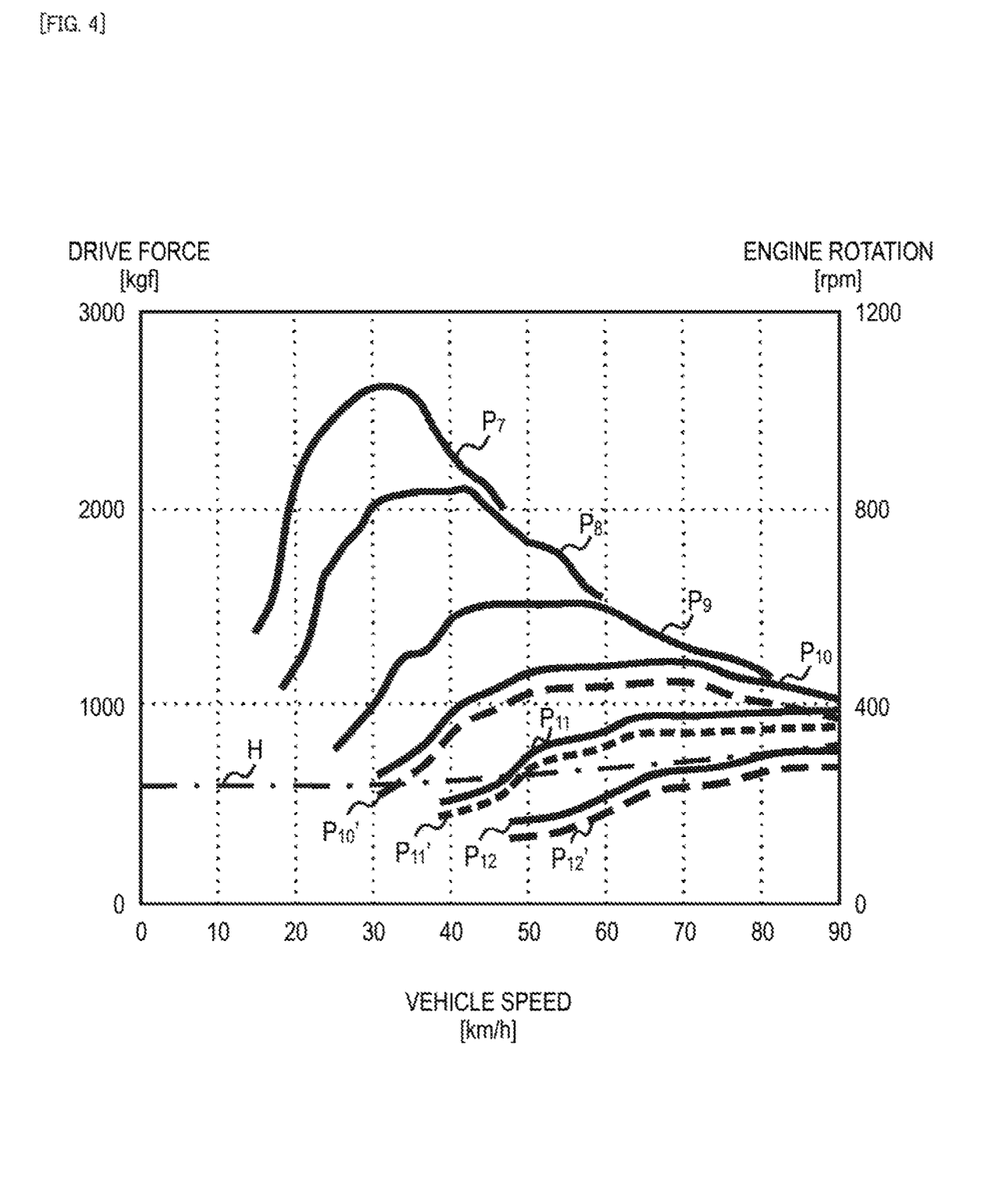
FIG. 4 is a travel performance diagram of the vehicle.

The method for selecting a current gear by the current gear stage selection unit 13 will be described with reference to FIG. 4. FIG. 4 is a travel performance diagram of the vehicle V. A vertical axis in FIG. 4 indicates drive force of the engine 1 by kgf, and a horizontal axis indicates the speed of the vehicle V by km/h. Solid lines $P_7$ to $P_{12}$ indicate the maximum drive force of the vehicle Vat the seventh to twelfth stages, respectively. Broken lines $P_{10}'$ to $P_{12}'$ are corrected drive force of the current gear stages at 10 to 12 stages, respectively. The corrected drive force is a value obtained by multiplying the maximum drive force by a predetermined coefficient smaller than 1.

A curve H indicates the travel resistance of the currently travelling vehicle V in the current travel segment A. Generally, the fuel consumption of the vehicle V decreases as the gear stage increases. On the other hand, if a gear stage, which has the maximum drive force smaller than the travel resistance in the current travel segment A, is selected in the current gear stage selection unit 13, the travel resistance applied to the vehicle V in the current travel segment becomes larger than the maximum drive force of the vehicle V, so that the vehicle V stalls. Further, if a gear stage, which has corrected drive force at a current gear stage smaller than the travel resistance in the current travel segment A, is selected in the current gear stage selection unit 13, the vehicle V stalls, unless actual drive force becomes larger than the travel resistance.

Thus, the current gear stage selection unit 13 selects the highest gear stage, as the current gear stage, among the gear stages at which the corrected drive force at the current gear stage is larger than the travel resistance in the current travel segment A. The current gear stage selection unit 13 selects the gear stage such that the corrected drive force at the current gear stage is larger than the travel resistance in the current travel segment A. Thus, when a difference between the maximum drive force and the corrected drive force at the current gear stage is set as drive force which is the predetermined value D1, the maximum drive force of the vehicle V is larger than the travel resistance in the current travel segment A by at least the predetermined value D1 or more.

In the example of FIG. 4, when the speed of the vehicle V is 80 km/h, the corrected drive force of the current gear stage with 12 stages indicated by the broken line $P_{12}'$ is smaller than the travel resistance in the current travel segment A indicated by the curve H. On the other hand, a gear stage of the eleventh stage indicated by a broken line $P_{11}'$ is the highest gear stage among the gear stages in which the corrected drive force of the current gear stage is larger than the travel resistance in the current travel segment A. Therefore, the current gear stage selection unit 13 selects the gear stage of the eleventh stage.

The road slope obtaining unit 14 obtains a road slope on the road on which the vehicle V is currently traveling, based on the information indicating the position of the vehicle V obtained from the GPS sensor 3 and map information stored in the storage unit 11. The road slope obtaining unit 14 obtains the road slope in a predetermined slope obtaining range, and obtains, for example, the road slope from a travel position of the vehicle V obtained from the GPS sensor 3 to a position 500 m ahead of the vehicle V in the travel direction. The road slope obtaining unit 14 obtains the road slope, for example, per measurement unit of 25 m, and reads the road slope at the position of 500 m ahead of the travel position of the vehicle from the storage unit 11 each time the vehicle V moves forward 25 m.

On the basis of the road slope obtained by the road slope obtaining unit 14, the travel segment determination unit 15 determines the current travel segment A and the next travel segment B. First, the travel segment determination unit 15 determines a temporary travel segment in the slope obtaining range. For example, the travel segment determination unit 15 determines a minimum segment from the travel position of the vehicle V to 100 m ahead of the vehicle V in the travel direction as the temporary travel segment.

[Method for Evaluating Travel Segment]

Figure 5:
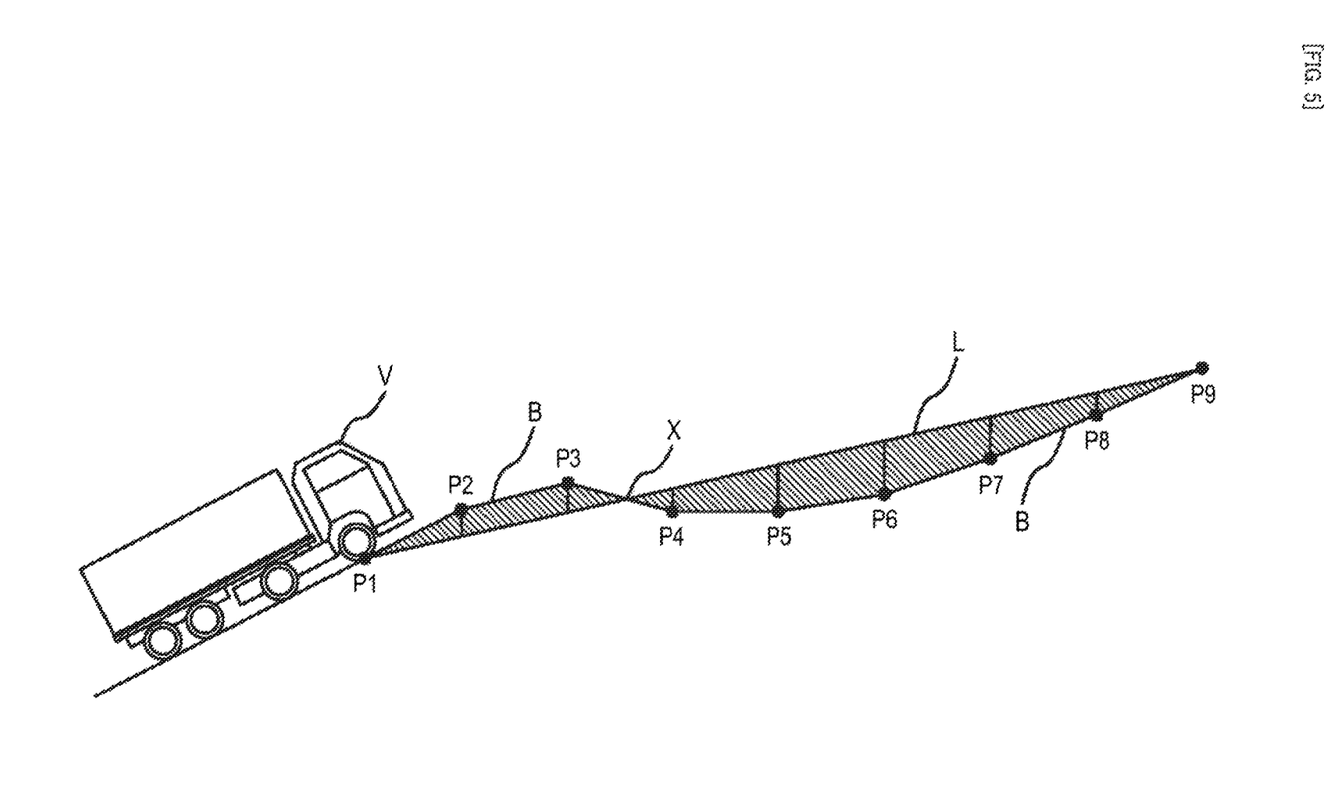
FIG. 5 is a diagram showing a method for evaluating a travel segment determined by a travel segment determination unit.

Next, a method for evaluating the travel segment by the travel segment determination unit 15 will be described with reference to FIG. 5. FIG. 5 shows a state in which the temporary travel segment is divided. In a case where the temporary travel segment is within a range from a travel position P1 to a position P9 of the vehicle V, the travel segment determination unit 15 equally divides the temporary travel segment into a plurality of segments. Here, the travel segment determination unit 15 equally divides the temporary travel segment into eight parts at positions P2, P3, . . . , P8. Further, the travel segment determination unit 15 determines a total area of parts formed between: a broken line B, which sequentially follows line segments respectively connecting the positions P1 and P2, the positions P2 and P3, the positions P3 and P4, the positions P4 and P5, the positions P5 and P6, the positions P6 and P7, the positions P7 and P8, and the positions P8 and P9, which are end points of the equally divided segments; and a line segment L connecting P1 and P9.

The broken line B intersect with the line segment L at a position X between the positions P3 and P4. The total area of parts formed between the broken line B and the line segment L is obtained as the sum of areas of a tetragon formed by four positions including the positions P1, P2, P3, and X, and an area of a heptagon formed by seven positions including the positions X, P4, P5, P6, P7, P8, and P9. At this time, the tetragon is formed above the line segment L. and the heptagon is formed below the line segment L. Therefore, the travel segment determination unit 15 may determine the total area by setting the area of the part formed above the line segment L as a positive area and by setting the area of the part formed below the line segment L as a negative area.

The travel segment determination unit 15 compares an absolute value of the total area of parts formed between the broken line B and the line segment L with an equal-slope determination threshold, and determines that a segment from the position P1 to the position P8 excluding the end position P9 is one travel segment if the absolute value of the total area is greater than the equal-slope determination threshold. The equal-slope determination threshold is a value for determining whether the slopes of positions in the travel segment can be considered as equal.

In contrast, if the absolute value of the total area is smaller than the equal-slope determination threshold, the travel segment determination unit 15 further extends the temporary travel segment. For example, the travel segment determination unit 15 adds a new position P10 such that the temporary travel segment is extended by a measurement unit, and similarly obtains a total area of parts formed between: a broken line that sequentially follows line segments between positions P(k) to P(k+1), where k=1, 2, . . . , 9, which are endpoints of sections obtained by equally dividing a range from the positions P1 to P10 as the temporary travel sections; and a line segment between P1 and P10, which are end points of the temporary travel segment. The travel segment determination unit 15 determines one travel segment by extending the temporary travel segment until the absolute value of the total area becomes greater than the equal-slope determination threshold. The travel segment determination unit 15 determines the current travel segment A and the next travel segment B by sequentially determining a plurality of travel segments adjacent to each other.

The next gear stage selection unit 16 selects the next gear stage, which is a gear stage of the transmission 2 in the next travel segment B, based on the road slope of the next travel segment B and the speed of the vehicle V. The next gear stage selection unit 16 determines the travel resistance of the next travel segment B applied to the vehicle V using the road slope obtained by the road slope obtaining unit 14, whereas the current gear stage selection unit 13 determines the travel resistance of the current travel segment A from the relationship between the drive force of the vehicle V and the acceleration of the vehicle V. The next gear stage selection unit 16 selects the highest gear position, as a next gear stage, among the gear stages in which the maximum drive force of the vehicle V becomes larger than the travel resistance of the next travel segment B of the vehicle V by a predetermined value D2 or more. Therefore, the allowance drive force obtained by subtracting the travel resistance of the next travel segment B of the vehicle V from the maximum drive force of the vehicle V when the gear shifts to the next gear stage is equal to or greater than the predetermined value D2 if there is no variation in the speed of the vehicle V or the like.

Since the next gear stage selection unit 16 obtains road slope data corresponding to the position of the vehicle V obtained by the GPS sensor 3, the travel resistance of the next travel segment B can be grasped with higher accuracy than the travel resistance of the current travel segment A. Therefore, for the calculation of the current gear stage, the next gear stage can be selected under a condition that the predetermined value D2, which is the drive force as the difference between the maximum drive force and the corrected drive force at the next gear stage, is set to be smaller than the predetermined value D1 during selection of the current gear stage. Since the predetermined value D2 can beset to be smaller than the predetermined value D1, a frequency at which the next gear stage selection unit 16 selects a higher gear stage is increased. Therefore, the fuel efficiency can be further improved.

Figure 6:
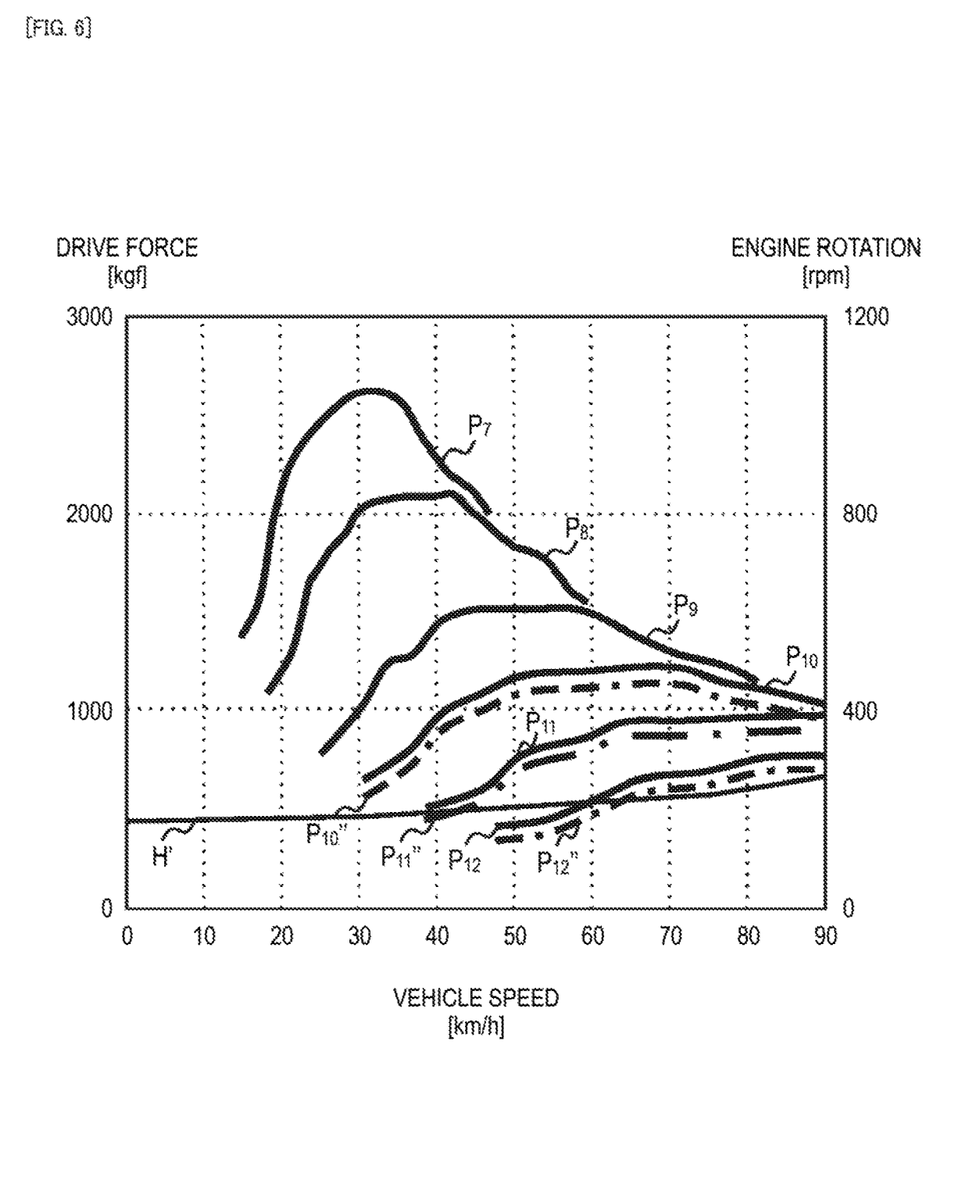
FIG. 6 is a travel performance diagram of the vehicle.

A method for selecting the next gear stage by the next gear stage selection unit 16 will be described with reference to FIG. 6. FIG. 6 is a travel performance diagram of the vehicle V. Similarly to FIG. 4, a vertical axis of FIG. 6 indicates the drive force of the vehicle by kgf, and a horizontal axis indicates the speed of the vehicle V by km/h. Solid lines $P_7$ to $P_{12}$ denote the maximum drive force of the vehicle V in the seventh to twelfth stages, respectively, and are the same as those in FIG. 4. The dash-dot lines $P_{10}$ to $P_{12}$ are corrected drive force of the next gear stage in the tenth to twelfth stages, respectively. Since the predetermined value D2, which is the drive force as the difference between the maximum drive force and the corrected drive force at the next gear stage, is smaller than the predetermined value D1, the dash-dot lines $P_{10}''$ to $P_{12}''$ denote values larger than those denoted by the broken lines $P_{10}'$ to $P_{12}'$ indicating the corrected drive force of the current gear stage at the tenth to twelfth stages. The corrected drive force of the next gear stage is a value obtained by multiplying the maximum drive force by a predetermined coefficient smaller than 1.

A curve H' indicating the travel resistance of the next travel segment B is shown in FIG. 6. The travel resistance of the curve H' may differ from the travel resistance of the curve H in the slope of the travel segment. The next gear stage selection unit 16 selects the highest gear position among the gear stages having the corrected drive force at the next gear stage exceeding the travel resistance of the next travel segment B.

In the example of FIG. 6, when the speed of the vehicle V is 80 km/h, the highest gear position among the gear stages having the corrected drive force of the next gear stage exceeding the travel resistance of the next travel segment B indicated on the curve H' is the gear stage of the twelfth stage. Therefore, the next gear stage selection unit 16 selects the gear stage of the twelfth stage as the next gear stage.

The shift control unit 17 controls the vehicle V to shift by controlling the transmission 2. The shift control unit 17 shifts the vehicle V to the current gear stage selected by the current gear stage selection unit 13 in the current travel segment A. The shift control unit 17 shifts the vehicle V to the current gear stage selected by the current gear stage selection unit 13, rather than the next gear stage selected by the next gear stage selection unit 16, when the following conditions are not satisfied: the travel mode is the automatic travel mode; the speed limit device of the vehicle V is operating; and the vehicle V is in a steady state where a fluctuation range of the speed of the vehicle V measured by the speed sensor 5 is smaller than a steady drive determination threshold. The steady travel determination threshold is a value for detecting the fact that the vehicle V is traveling on a road with few right or left turns and stops. An example of a road with little right or left turns and stops include a highway.

In a case where the travel resistance of the next travel segment B is smaller than the travel resistance of the current travel segment A, the shift control unit 17 performs upshifting to the next gear stage during travel in the current travel segment A under a predetermined condition. More specifically, the shift control unit 17 compares the travel resistance in the current travel segment A with the drive force at the next gear stage. In other words, the shift control unit 17 compares whether the maximum drive force in the next gear stage is larger than the travel resistance of the current travel segment.

In a case where the maximum drive force of the vehicle V is equal to or greater than the travel resistance of the vehicle V in the current travel segment A, the shift control unit 17 performs upshifting to the next gear stage in the current travel segment A.

In a case where the vehicle V is in the automatic drive mode, since there is no need for acceleration, the shift control unit 17 performs upshifting to the next gear stage in the current travel segment A, even if the allowance drive force in the current travel segment A when the vehicle V upshifts to the next gear stage is less than the predetermined value D1. The next gear stage selection unit 16 selects the next gear stage so as to make the allowance drive force in the next travel segment equal to or greater than the predetermined value D2, and the travel resistance in the next travel segment is reduced. Accordingly, even if the allowance drive force is less than the predetermined value D1 in the current travel segment, the vehicle speed can be maintained in the next travel segment B.

On the other hand, in a case where the accelerator opening degree measured by the accelerator opening degree sensor 6 in the automatic travel mode is equal to or greater than an acceleration determination threshold, the driver is likely to obtain the acceleration prior to reducing the fuel consumption. The acceleration determination threshold is a threshold for determining whether the driver intends to travel at a speed higher than the speed of the vehicle V set in the automatic drive mode. Therefore, in a case where the accelerator opening degree of the vehicle V is equal to or greater than the acceleration determination threshold value in the automatic drive mode, the shift control unit 17 does not perform upshifting to the next gear stage.

In a case where a remaining segment of the current travel segment A is short in the operation travel mode and sufficient acceleration is obtained in the next travel segment B, the driver is less likely to feel uncomfortable even if the acceleration of the vehicle V is small. Therefore, the shift control unit performs upshifting to the next gear stage in the current travel segment A in a case: (1) even if the allowance drive force in the current travel segment A when upshifting to the next gear stage in the operation travel mode is less than the predetermined value D1; (2) the remaining distance of the current travel segment A is less than the predetermined distance; and (3) the vehicle V does not stall in the current travel segment A when upshifting to the next gear stage.

The predetermined distance is a distance at which the driver does not feel uncomfortable with a decrease in the acceleration of the vehicle V. The fact that the vehicle V does not stall in the current travel segment A when upshifting to the next gear stage corresponds to the fact that, when upshifting to the next gear stage, the drive force at the current speed of the vehicle V is equal to or greater than the travel resistance of the vehicle V in the current travel segment A.

The shift control unit 17 compares the travel resistance in the current travel segment A with the maximum drive force of the vehicle V at the next gear stage, in order to confirm whether the vehicle V does not stall in the current travel segment A when upshifting to the next gear stage. In a case where the maximum drive force at the next gear stage is equal to or larger than the travel resistance in the current travel segment A, the vehicle V does not stall in the current travel segment A when upshifting to the next gear stage. On the other hand, in a case where the maximum drive force at the next gear stage is less than the travel resistance in the current travel segment A, the vehicle V stalls in the current travel segment A when upshifting to the next gear stage.

In a case where the vehicle V stalls in the current travel segment A when upshifting to the next gear stage, the shift control unit 17 does not perform upshifting to the next gear stage. Further, the shift control unit 17 postpones upshifting to the next gear until the distance of the remaining segment of the current travel section A is less than the predetermined distance, if: (1) the allowance drive force in the current travel segment A when upshifting to the next gear stage is less than the predetermined value D1; and (2) the distance of the remaining segment of the current travel segment A is equal to or greater than the predetermined distance in the operation travel mode. After the upshifting to the next gear stage is postponed, the shift control unit 17 may determine again whether to upshift to the next gear stage when the distance of the remaining segment of the current travel segment A is less than the predetermined distance in the operation travel mode.

In a case where the upper limit speed set in the vehicle V has been reached in the operational travel mode and the speed limit device is operating, the speed limit device controls the engine 1 and the transmission 2 such that the speed of the vehicle V does not exceed the set upper limit speed. In a case the speed limit device is operating, the vehicle V is unable to accelerate.

Therefore, in a case where the speed of the vehicle V in the operation travel mode is the upper limit speed set for the vehicle V, the shift control unit 17 performs upshifting to the next gear stage in the current travel segment A without postponing the upshifting to the next gear stage, even if: (1) the allowance drive force in the current travel segment A when upshifting to the next gear stage is less than the predetermined value D1; and (2) the distance of the remaining segment of the current travel segment A is equal to or greater than a predetermined distance.

[Flowchart Illustrating Example of Operation of Vehicle Control Device 10]

Figure 7:
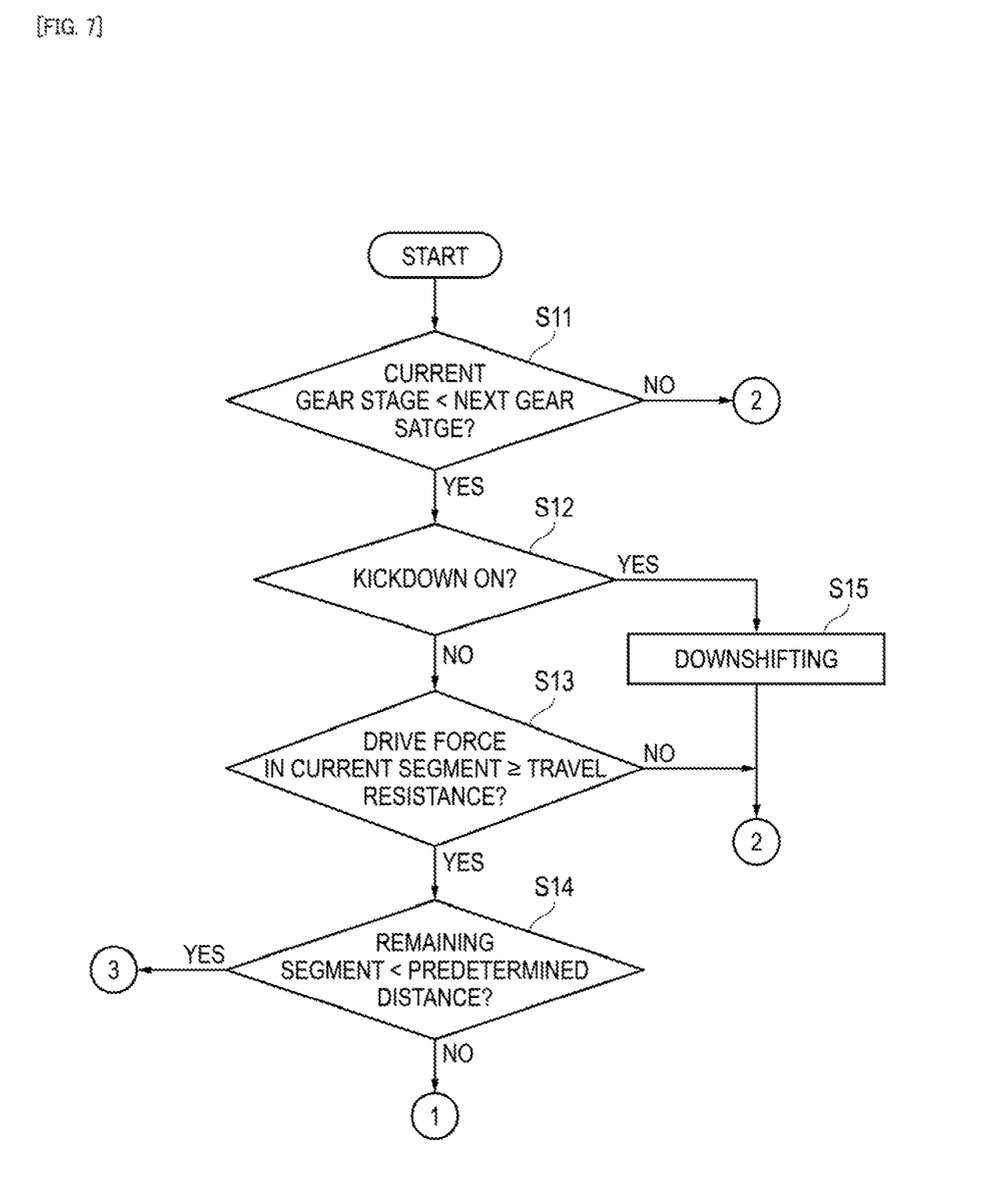
FIG. 7 is a flowchart illustrating an example of operation of the vehicle control device.
Figure 8:
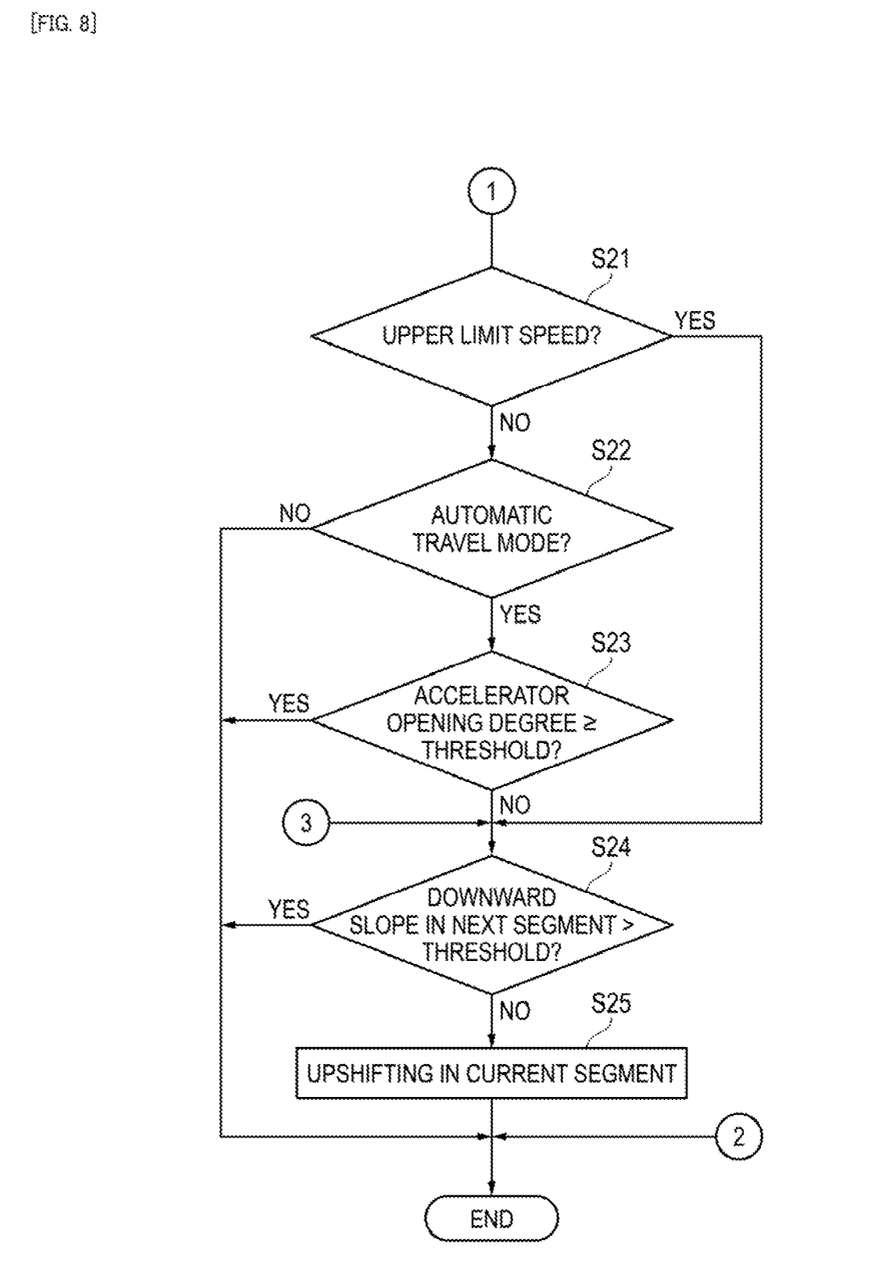
FIG. 8 is a flowchart illustrating an example of operation of the vehicle control device.

FIGS. 7 and 8 are flowcharts illustrating an example of operation of the vehicle control device 10. This processing procedure is started when the vehicle V is in a steady state where a fluctuation range of the speed of the vehicle V measured by the speed sensor 5 is smaller than a steady travel determination threshold. The steady travel determination threshold is a value for detecting the fact that the vehicle V is traveling on a road with few right or left turns and stops.

First, the shift control unit 17 compares the current gear stage of the vehicle V with the next gear stage thereof (S11). In a case where the gear stage is higher than the current gear stage (YES in S11), the shift control unit 17 determines whether the accelerator opening degree assigned to the kickdown operation is measured by the accelerator opening sensor 6 (S12). In a case where it is determined that the accelerator opening degree measured by the accelerator opening sensor is not the accelerator opening degree assigned to the kickdown operation (NO in S12), the shift control unit 17 compares the drive force in the current travel segment A when upshifting to the next gear stage with the travel resistance (S13). In a case where the drive force of the current travel segment A is equal to or greater than the travel resistance (YES in S13), the shift control unit 17 compares the distance of the remaining segment of the current travel segment A with a predetermined distance (S14). The predetermined distance is a distance that the driver does not feel uncomfortable due to the decrease in the acceleration of the vehicle V. In a case where the distance of the remaining segment of the current travel segment A is equal to or greater than the predetermined distance (NO in S14), the shift control unit 17 proceeds to processing of a step S21.

In a case where the distance of the remaining segment of the current travel segment A is equal to or greater than the predetermined distance, the shift control unit 17 determines whether or the speed of the vehicle V has reached the upper limit speed set for the vehicle V (S21). In a case where the speed of the vehicle V has not reached the upper limit speed (NO in S21), the shift control unit 17 determines whether the vehicle V is in the automatic drive mode (S22). In a case where the vehicle V is in the automatic drive mode (YES in S22), the shift control unit 17 determines whether the accelerator opening degree measured by the accelerator opening sensor 6 is equal to or greater than the acceleration determination threshold (S23).

In a case where the accelerator opening is less than the acceleration determination threshold (NO in S23), the shift control unit 17 determines whether the next travel segment B is a downward slope having a slope exceeding an inclination determination threshold (S24). The inclination determination threshold is a threshold for detecting an inclination at which an engine brake is required to be applied. In a case where the shift control unit 17 determines that the next travel segment B is not a downward slope having a slope exceeding the inclination determination threshold (NO in S24), the shift control unit 17 performs the upshifting to the next gear stage in the current travel segment A (S25), and ends the processing.

In a case where the next gear stage is equal to or lower than the current gear stage in the determination of the step S11 of FIG. 7 (NO in SI), the shift control unit 17 ends the processing. In a case where the accelerator opening degree measured by the accelerator opening degree sensor 6 is determined to be the accelerator opening degree assigned to the kickdown operation in the determination of the step S12 (YES in S12), the shift control unit 17 performs the downshifting from the current gear stage (S15) and ends the processing. In a case where the drive force of the current travel segment A in the next gear stage is smaller than the travel resistance in the determination of the step S13 (NO in S13), the shift control unit 17 ends the processing without causing upshifting to the next gear stage. In a case where the distance of the remaining segment of the current travel segment A is less than the predetermined distance in the determination in step S14 (YES in step S14), the shift control unit 17 proceeds to the processing of the step S24.

In a case where the speed of the vehicle V reaches the upper limit speed in the determination of the step S21 (YES in step S21), the shift control unit 17 proceeds to the processing of the step S24. In a case where the vehicle V is in the operation travel mode in the determination of the step S22 (NO in S22), the shift control unit 17 ends the processing without causing the upshifting to the next gear stage. In a case where the accelerator opening degree measured by the accelerator opening degree sensor 6 is equal to or greater than the acceleration determination threshold in the determination of the step S23 (YES in S23), the shift control unit 17 ends the processing without causing the upshifting to the next gear stage.

In a case where the next travel segment B is a downward slope having a slope exceeding the inclination determination threshold (YES in S24) in the determination of the step S24, it is necessary to apply a stronger engine brake, so that it is preferable to maintain the current gear stage lower than the next gear stage. Therefore, the shift control unit 17 ends the processing without causing the upshifting to the next gear stage.

According to the present illustrative embodiment, even if the allowance drive force in the current travel segment A, which is obtained by subtracting the travel resistance of the vehicle V in the current travel segment A from the maximum drive force at the current speed of the vehicle V at the next gear stage, is less than the predetermined value D1, the shift control unit 17 performs the upshifting to the next gear stage in a case: the allowance drive force in the current travel segment B, which is obtained by subtracting the travel resistance of the vehicle V in the current travel segment B from the maximum drive force at the current speed of the vehicle V at the next gear stage, is equal to or larger than the predetermined value D2; and the travel resistance decreases in the next travel segment. Therefore, the shift control unit 17 is able to bring the engine 1 into a state of high load and low rotation earlier by advancing the timing of upshifting to the next gear stage. Therefore, it is possible reduce the fuel consumption of the vehicle V.

According to the present illustrative embodiment, the shift control unit 17 performs the upshifting to the next gear stage, in a case where the drive force at the current speed of the vehicle V at the next gear stage is equal to or larger than the travel resistance of the vehicle V in the current travel segment A. Therefore, the shift control unit 17 can prevent the stall of the vehicle V in the current travel segment due to the upshifting to the next gear stage.

According to the present illustrative embodiment, the shift control unit 17 postpones the upshifting to the next gear stage in a case: the allowance drive force of the current travel segment A in the next gear stage is less than the predetermined value D1 in the operation travel mode; and the distance of the remaining segment of the current travel segment A is equal to or greater than the predetermined distance. Therefore, it is possible to prevent the driver from feeling uncomfortable when the state where the allowance drive fore of the vehicle V is reduced continues for a predetermined distance or more in the operation travel mode. On the other hand, in the automatic drive mode, there is no need to accelerate. Therefore, there is no need to ensure the allowance drive force, and the shift control unit 17 is able to select a higher gear stage.

According to the present illustrative embodiment, in a case where the speed of the vehicle V is the upper limit speed set for the vehicle V, the shift control unit 17 does not postpone upshifting to the next gear stage, even if: the allowance drive force of the current travel segment A in the next gear stage is less than the predetermined value D1; and the distance of the remaining segment of the current travel segment A is equal to or greater than the predetermined distance. In a case where the speed limit device is operating at the upper limit speed set for the vehicle V, as the vehicle V is unable to accelerate, there is no need to ensure the allowance drive force. Therefore, the shift control unit 17 is able to select a high gear position. Accordingly, the shift control unit 17 can reduce the fuel consumption of the vehicle V.

According to the present illustrative embodiment, the shift control unit 17 does not perform the upshifting to the next gear stage in a case where the accelerator opening degree measured by the accelerator opening degree sensor 6 of the vehicle V is equal to or greater than the acceleration determination threshold in the automatic drive mode. In a case where the accelerator opening degree measured by the accelerator opening degree sensor 6 is equal to or greater than the acceleration determination threshold, the driver is more likely to give priority to obtaining acceleration rather than reducing fuel consumption. Therefore, by maintaining the current gear stage, the shift control unit 17 can prevent a decrease in acceleration caused by the upshifting.

In the present illustrative embodiment, there has been described an example in which the shift control unit 17 allows the allowance drive force in the current travel segment to be close to zero during travelling at the next gear stage, and performs upshifting to the next gear stage in the current travel segment A, in a case: (1) the travel resistance of the next travel segment 13 is smaller than the travel resistance of the current travel segment A; (2) the allowance drive force in the current travel segment A when upshifting to the next gear stage is less than the predetermined value D1; and (3) the allowance drive force in the next travel segment B when upshifting to the next gear stage is equal to or larger than the predetermined value D2, on condition that (4) the vehicle V is in the automatic travel mode or the speed of the vehicle V is the upper limit value set for the vehicle V.

However, the present disclosure is not limited to an example in which the aspect that the vehicle V is an automatic travel mode or the speed of the vehicle V is the upper limit value set for the vehicle V is set as a condition. For example, in the case of (1) to (3) described above, the shift control unit 17 may be configured to perform the upshifting to the next gear stage in the current travel segment A on condition that the vehicle V is in a steady state where the fluctuation range of the speed of the vehicle V measured by the speed sensor 5 is smaller than the steady travel determination threshold.

The current gear stage selection unit 13 selects a gear stage such that the drive force of the vehicle V is larger than the travel resistance of the vehicle V in the current travel segment A by the predetermined value D1 or more, and the next gear stage selection unit 16 selects a gear stage so that the drive force of the vehicle V is larger than the travel resistance of the vehicle V in the next travel segment B by the predetermined value D2 or more. The present illustrative embodiment has described an example in which the predetermined value D2 is smaller than the predetermined value D1 or the predetermined value D2 is 0. However, the present disclosure is not limited to the example. For example, the predetermined value D1 and the predetermined value D2 may be the same value.

The present illustrative embodiment has described an example in which the current gear stage selection unit 13 obtains the travel resistance in the current travel segment A from the relationship between the drive force of the vehicle V and the acceleration of the vehicle V and selects the current gear stage based on the travel resistance and the speed of the vehicle V. However, the present disclosure is not limited to the example. For example, the current gear stage selection unit 13 may select the current gear stage by using the road slope read from the storage unit 11 by the road slope obtaining unit 14.

In the present illustrative embodiment, an example in which the predetermined values D1 and D2 are constant regardless of the gear stage to be selected has been described. However, the present disclosure is not limited to the example. For example, a predetermined value different for each gear stage may be used, or a predetermined value may be set larger when a higher gear stage is selected.

In the present illustrative embodiment, an example in which the current gear stage selection unit 13 and the next gear stage selection unit 16 respectively select the current gear stage and the next gear stage by using the travel performance diagram of FIG. 4 has been described. However, the present disclosure is not limited to the example. For example, the current gear stage selection unit 13 and the next gear stage selection unit 16 may be configured to respectively select the current gear stage and the next gear stage by using a constant horsepower diagram.

The present disclosure have been described using the illustrative embodiment, but the technical scope of the present disclosure is not limited to the above-described illustrative embodiment and various modifications and changes can be made within the scope of the present disclosure. For example, the specific illustrative embodiment of the dispersion and integration of the device is not limited to the above illustrative embodiment, and all or a part of the illustrative embodiment may be functionally or physically distributed and integrated in optional units. In addition, new illustrative embodiments generated by any combination of a plurality of illustrative embodiments are also contained in the illustrative embodiment of the present disclosure. The effect of the new illustrative embodiment caused by the combination has the effect of the original illustrative embodiment.

This application is based on the Japanese Patent Application (Japanese Patent Application No. 2017-095967) filed on May 12, 2017, the contents of which are incorporated herein by reference.

INDUSTRIAL APPLICABILITY

The present invention has an effect of preventing an increase in fuel consumption in a case where a slope varies in a road on which a vehicle is currently traveling, and is useful for a vehicle control device, a vehicle control method, and the like.

REFERENCE SIGNS LIST

1: Engine
2: Transmission
3: GPS sensor
4: Weight sensor
5: Speed sensor
6: Accelerator opening degree sensor
10: Vehicle control device
11: Storage unit
12: Control unit
13: Current gear stage selection unit
14: Road slope obtaining unit
15: Travel segment determination unit
16: Next gear stage selection unit
17: Shift control unit
V: Vehicle

The invention claimed is:

1. A vehicle control device comprising a controller configured to:
   determine a next travel segment ahead of a vehicle in a travelling direction, the next segment being a travel segment with a road slope different from that of a current travel segment where the vehicle is currently traveling;
   select a next gear stage, which is a gear stage of the vehicle in the next travel segment, based on the road slope of the next travel segment; and perform a shift control comprising performing upshifting to the next gear stage in the current travel segment in a case: a travel resistance in the next travel segment is smaller than a travel resistance in the current travel segment; a value obtained by subtracting the travel resistance of the vehicle in the current travel segment from a drive force at a current speed of the vehicle at the next gear stage is less than a first predetermined value; and a value obtained by subtracting the travel resistance of the vehicle in the next travel segment from a drive force at the current speed of the vehicle at the next gear stage is equal to or greater than a second predetermined value.

2. The vehicle control device according to claim 1, wherein in the performing of the shift control, the controller is configured to perform the upshifting to the next gear stage in the current travel segment in a case: the drive force at the current speed of the vehicle at the next gear stage is equal to or greater than the travel resistance of the vehicle in the current travel segment; and the value obtained by subtracting the travel resistance of the vehicle in the next travel segment from the drive force at the current speed of the vehicle at the next gear stage is equal to or greater than the second predetermined value.

3. The vehicle control device according to claim 1,
wherein the vehicle has: an automatic drive mode in which a constant-speed traveling is performed automatically; and an operation travel mode in which travelling is performed by an accelerator operation by a driver, and
wherein in the performing of the shift control, the controller is configured to postpone the upshifting to the next gear stage in a case: the value obtained by subtracting the travel resistance of the vehicle in the current travel segment from the drive force at the current speed of the vehicle at the next gear stage is less than the first predetermined value in the operation travel mode; and a distance of a remaining segment of the current travel segment is equal to or greater than a predetermined distance.

4. The vehicle control device according to claim 3, wherein in the performing of the shift control, the controller is configured not to postpone the upshifting to the next gear stage in a case: the value obtained by subtracting the travel resistance of the vehicle in the current travel segment from the drive force at the current speed of the vehicle at the next gear stage is less than the first predetermined value in the operation travel mode; a distance of the remaining segment of the current travel segment is equal to or greater than the predetermined distance; and a speed of the vehicle is an upper limit speed set for the vehicle.

5. The vehicle control device according to claim 3, wherein in the performing of the shift control, the controller is configured not to perform the upshifting to the next gear stage in a case an accelerator opening degree of the vehicle is equal to or greater than a threshold in the automatic drive mode.

6. A vehicle control method for a vehicle comprising a transmission and a controller, the method comprising controlling the controller to perform:
determining a next travel segment ahead of the vehicle in a travel direction, the next travel segment being a travel segment with a road slope different from that of a current travel segment where the vehicle is currently traveling;
selecting a next gear stage, which is a gear stage of the vehicle in the next travel segment, based on the road slope of the next travel segment; and
performing a shift control of upshifting to the next gear stage in the current travel segment in a case: a travel resistance in the next travel segment is smaller than a travel resistance in the current travel segment; a value obtained by subtracting the travel resistance of the vehicle in the current travel segment from a drive force at a current speed of the vehicle at the next gear stage is less than a first predetermined value; and a value obtained by subtracting the travel resistance of the vehicle in the next travel segment from a drive force at the current speed of the vehicle at the next gear stage is equal to or greater than a second predetermined value.

7. The vehicle control method according to claim 6, wherein the performing of the shift control comprises performing the upshifting to the next gear stage in the current travel segment in a case: the drive force at the current speed of the vehicle at the next gear stage is equal to or greater than the travel resistance of the vehicle in the current travel segment; and the value obtained by subtracting the travel resistance of the vehicle in the next travel segment from the drive force at the current speed of the vehicle at the next gear stage is equal to or greater than the second predetermined value.

8. The vehicle control method according to claim 6,
wherein the vehicle has: an automatic drive mode in which a constant-speed traveling is performed automatically; and an operation travel mode in which travelling is performed by an accelerator operation by a driver, and
wherein the performing of the shift control comprises postponing the upshifting to the next gear stage in a case: the value is obtained by subtracting the travel resistance of the vehicle in the current travel segment from the drive force at the current speed of the vehicle at the next gear stage is less than the first predetermined value in the operation travel mode; and a distance of a remaining segment of the current travel segment is equal to or greater than a predetermined distance.

9. The vehicle control method according to claim 8, wherein the performing of the shift control comprises not to postpone the upshifting to the next gear stage in a case: the value obtained by subtracting the travel resistance of the vehicle in the current travel segment from the drive force at the current speed of the vehicle at the next gear stage is less than the first predetermined value in the operation travel mode; a distance of the remaining segment of the current travel segment is equal to or greater than the predetermined distance; and a speed of the vehicle is an upper limit speed set for the vehicle.

10. The vehicle control method according to claim 8, wherein the performing of the shift control comprises not to perform the upshifting to the next gear stage in a case an accelerator opening degree of the vehicle is equal to or greater than a threshold in the automatic drive mode.

* * * * *